No. 666,196. Patented Jan. 15, 1901.
F. P. HOWE.
MAGNETIC STOP.
(Application filed July 3, 1900.)
(No Model.)
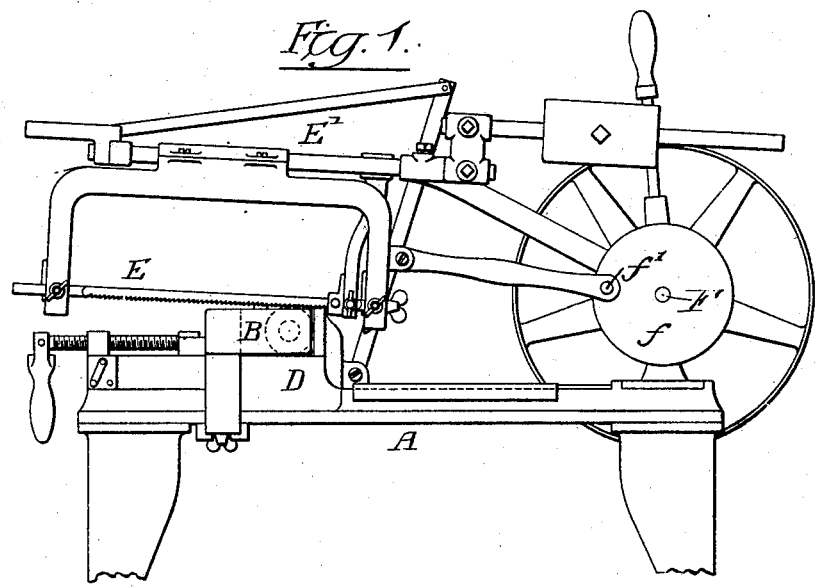
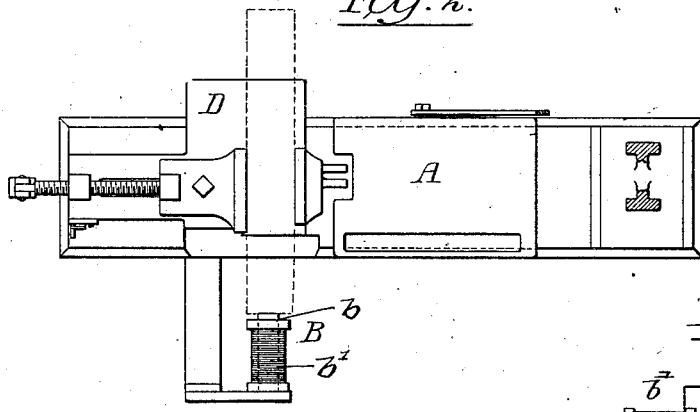
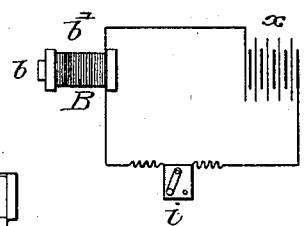
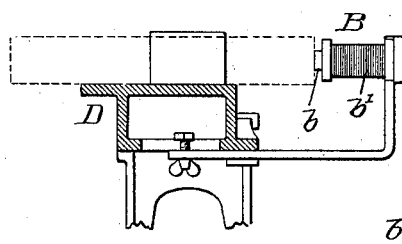
Witnesses:-
Frank L. A. Graham
Louis M. Whitehead
Inventor:
Frank P. Howe.
by his Attorneys

UNITED STATES PATENT OFFICE.

FRANK P. HOWE, OF PHILADELPHIA, PENNSYLVANIA.

MAGNETIC STOP.

SPECIFICATION forming part of Letters Patent No. 666,196, dated January 15, 1901.

Application filed July 3, 1900. Serial No. 22,421. (No model.)

*To all whom it may concern:*

Be it known that I, FRANK P. HOWE, a citizen of the United States, residing in Philadelphia, Pennsylvania, have invented certain Improvements in Magnetic Stops, of which the following is a specification.

The object of my invention is to provide a magnetic stop for machines for cutting off, drilling, or punching metals.

My invention is especially adapted for machines in which a number of articles of a given length are to be accurately cut, punched, or sheared.

In the accompanying drawings, Figure 1 is a side view of a cutting-off machine, illustrating my invention. Fig. 2 is a sectional plan view of Fig. 1. Fig. 3 is a sectional view on the line 3 3, Fig. 1; and Fig. 4 is a diagram of the electrical connections.

I will describe my invention in referring to a machine for cutting off rods and tubes to given lengths.

In the drawings, Fig. 1, my invention is applied to a cutting-off machine in which a hack-saw is used.

A is the base of the machine.

B is the magnetic stop.

D is the bed, on which the tube or rod to be cut is held.

E is the hack-saw, mounted on suitable guides E' and driven from a driving-shaft F, having a disk *f*, provided with a crank-pin *f'*, connected by a rod to the frame of the saw, so that as the shaft is revolved the saw will be reciprocated.

Referring to Fig. 4, the magnetic stop B has a core *b*, around which is wrapped the wire *b'*, thus forming an electromagnet. The magnet is connected to any suitable source of electric power *x*, and a switch *i* is provided within easy reach of the attendant, so that the attendant can operate the switch to cut the current from the magnet, and thus allow the piece to fall after it is cut. In many cases the current can be turned on and cut off from the magnet, as required, automatically by a suitable attachment to a moving part of the machine. For an instance of the operation of my invention if it is desired to make a number of small sections of a tube or rod which must be all of the same length the rod can be fed to the vicinity of the magnetic stop, whereupon the magnet will draw the piece to its exact place in contact with the stop and hold the rod to it until it is clamped or the saw or other cutting-off tool enters the work, when the switch can be reversed and the current cut off, so that when the cut is made the section will drop from the table. By turning the switch again and moving the tube or rod up to the stop, which is again magnetized, the rod or tube is drawn to its place, held until clamped or work has commenced upon it, and the above operation can be repeated.

In some instances two or more rods or tubes are cut off at the same time by the same tool, and in this event—for instance, if there are three sections being cut — the magnet will draw all three sections to it, insuring the accurate cutting of all of the sections.

The same device can be used for the same purpose on machines for punching, shearing, or drilling.

By the present method of cutting sections there is danger that carelessness on the part of the attendant will result in the sections being cut too short, owing to the fact that he may not bring the rod or tube in contact with the stop, or he may bring it up with such force that it will rebound, and when the section is cut too short it has to be discarded. By my invention accuracy is assured, as the magnet is of sufficient strength when the piece is brought into proximity to it to draw and hold it to the stop.

The magnet may form the entire stop or simply a portion of the stop without departing from my invention.

I claim as my invention—

1. The combination in a cutting-off or like machine, of a stop for the work and a magnet at the stop for holding the piece of work, substantially as described.

2. The combination in a cutting-off or like machine in which a stop is used, of a magnet at the stop for holding the piece of work, with means for energizing said magnet automatically or otherwise whereby the work is adjusted accurately to the stop and held there as long as desired by the magnetic attraction, substantially as described.

3. The combination in a cutting-off or like machine in which a stop is used, of a magnet at the stop for holding the piece of work, means for energizing the magnet, and a switch operated automatically or otherwise for controlling the current through the magnet, whereby the work is adjusted accurately to the stop and held there by the magnet as long as desired, the magnet being energized as desired by operating the switch, substantially as described.

In testimony whereof I have signed my name to this specification in the presence of two subscribing witnesses.

FRANK P. HOWE.

Witnesses:
SAM. C. REBMAN,
WM. C. FRICK.